Figure 4:
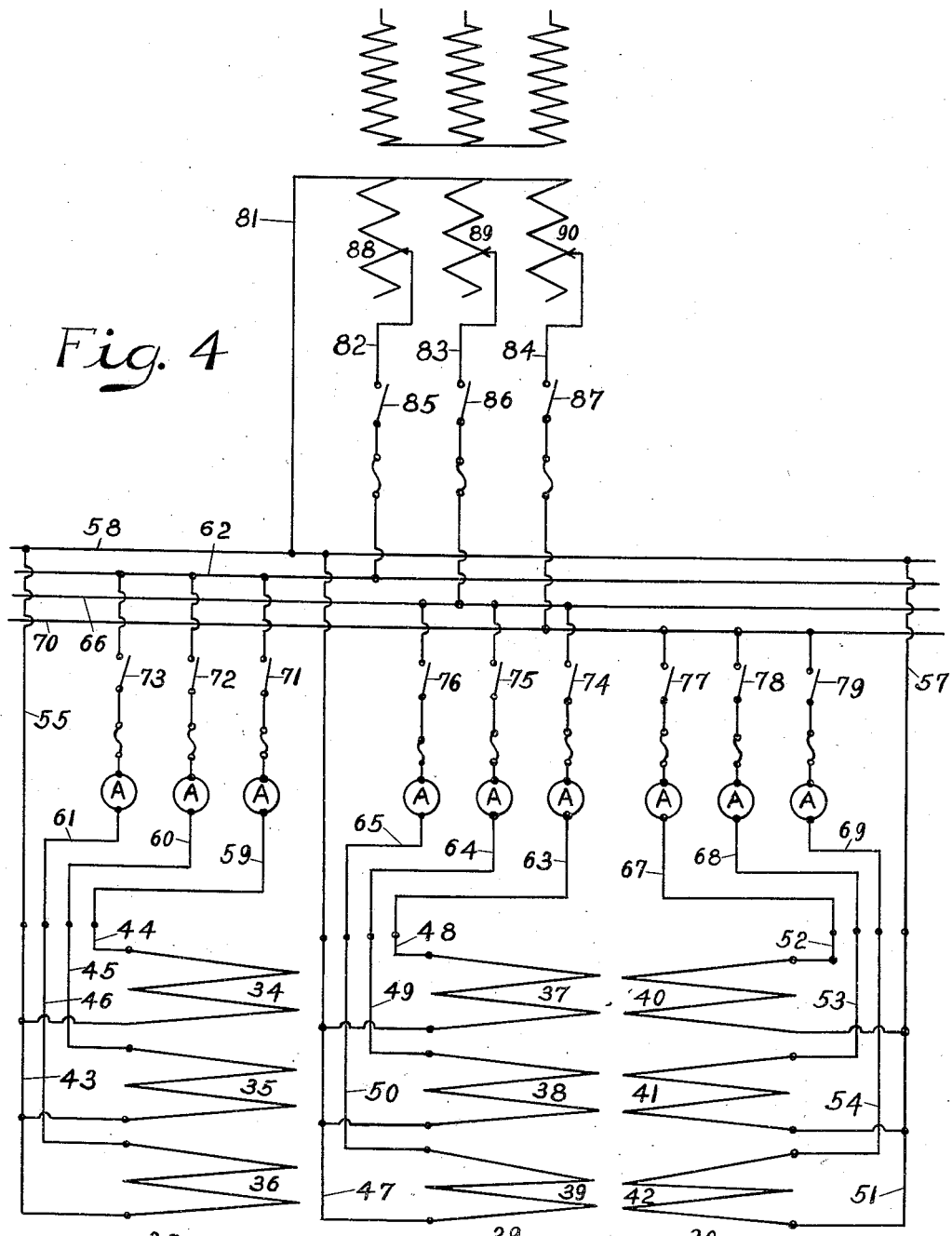

April 21, 1925.
R. G. TUGENDHAT
1,534,042
ELECTRICALLY HEATED TRAVELING OVENS
Filed Aug. 1, 1924    5 Sheets-Sheet 1
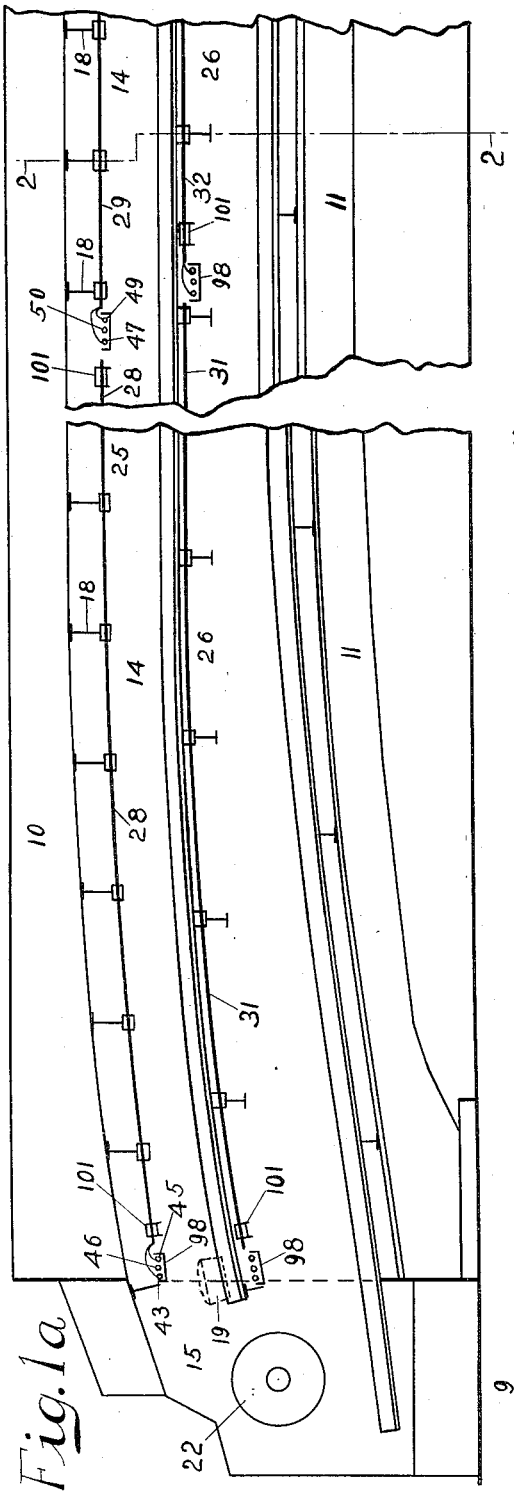
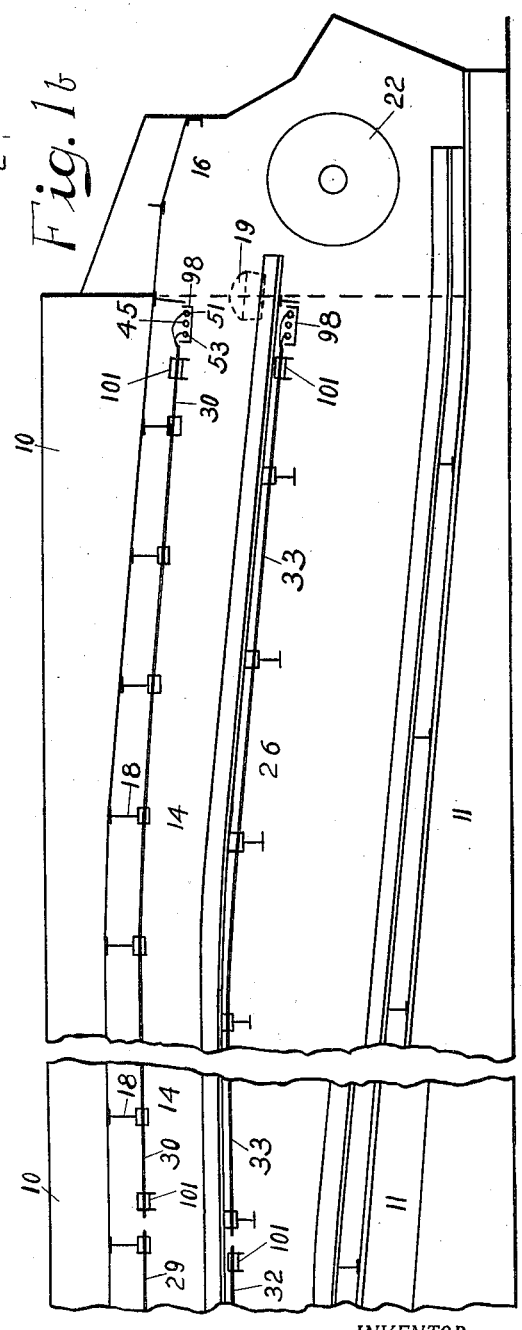
INVENTOR.
Robert George Tugendhat

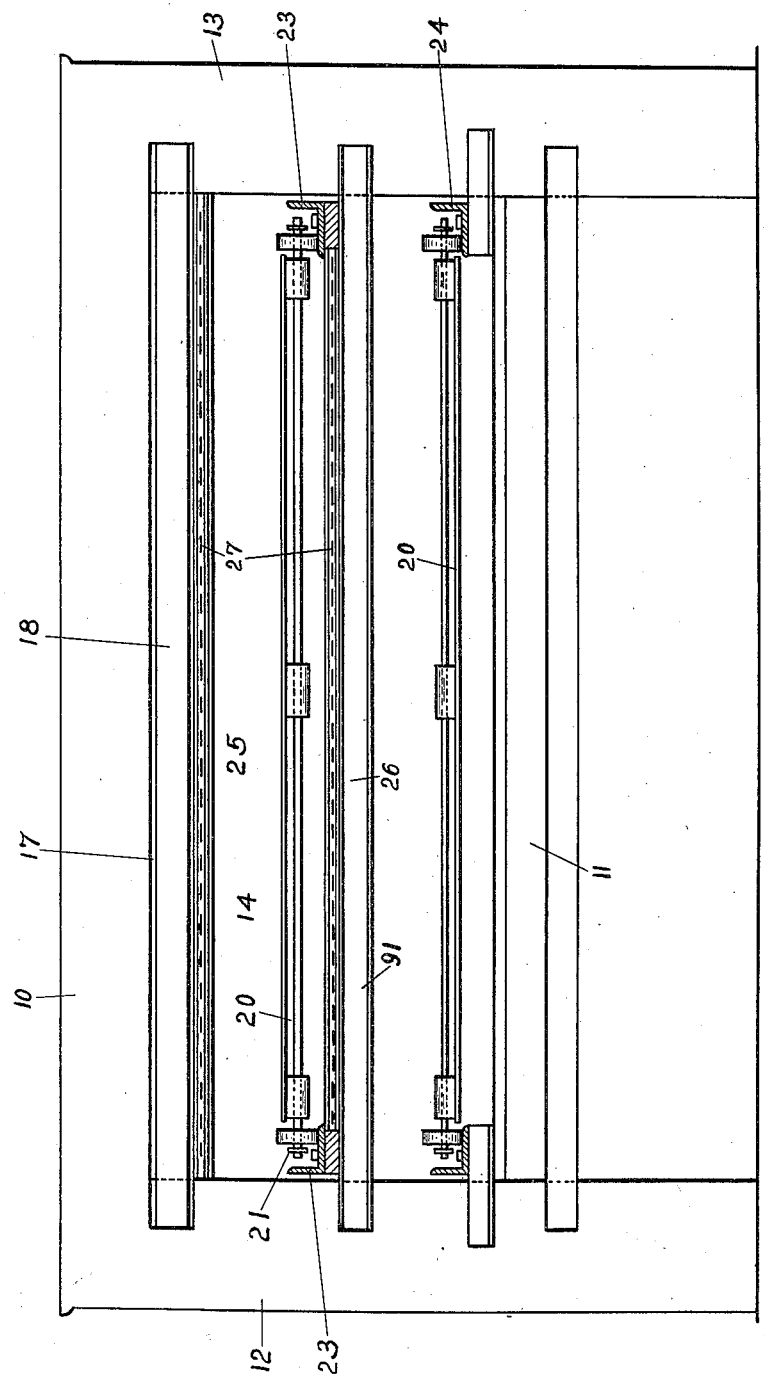

April 21, 1925. 1,534,042
R. G. TUGENDHAT
ELECTRICALLY HEATED TRAVELING OVENS
Filed Aug. 1, 1924  5 Sheets-Sheet 3
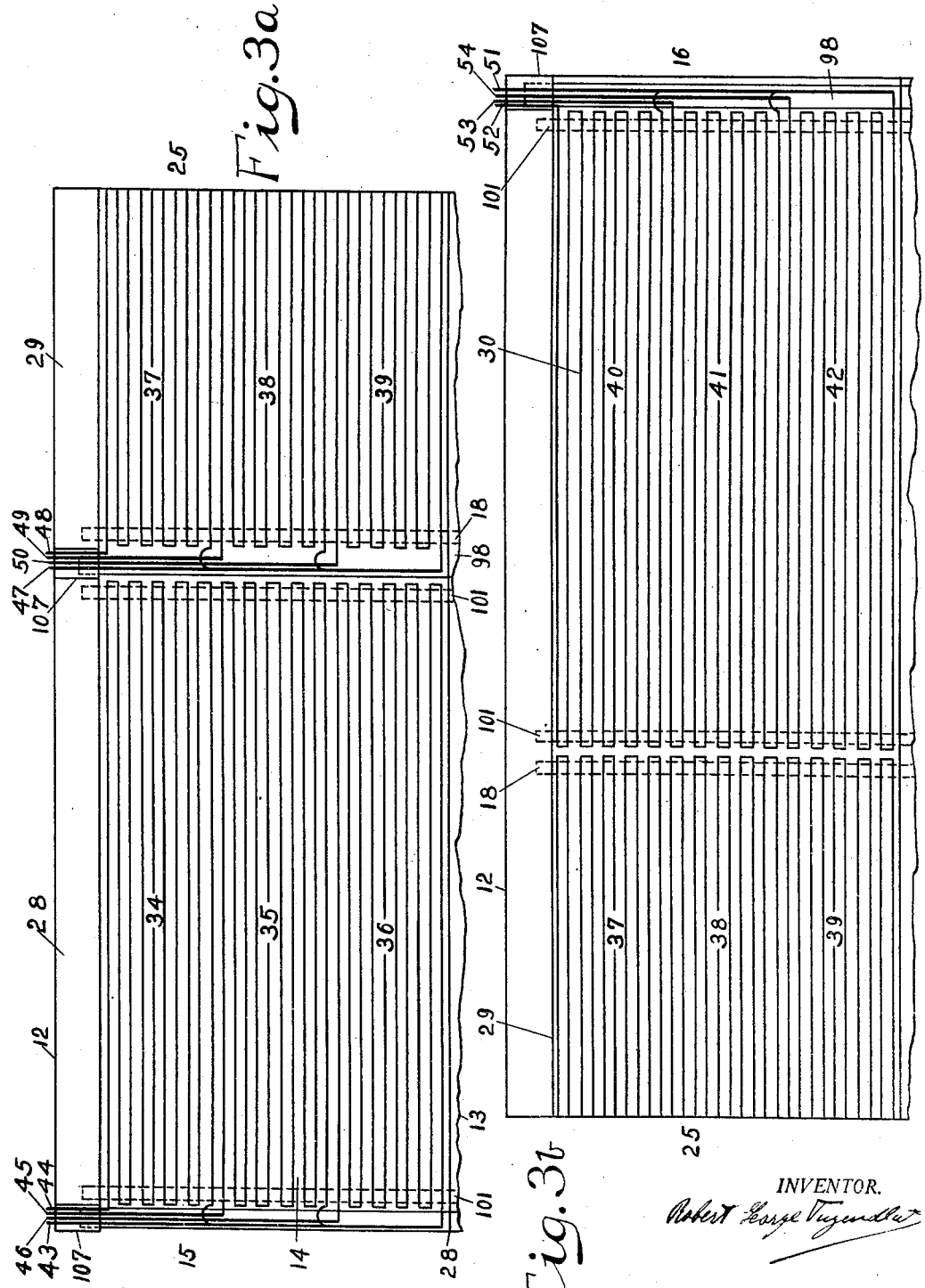
INVENTOR.
Robert George Tugendhat

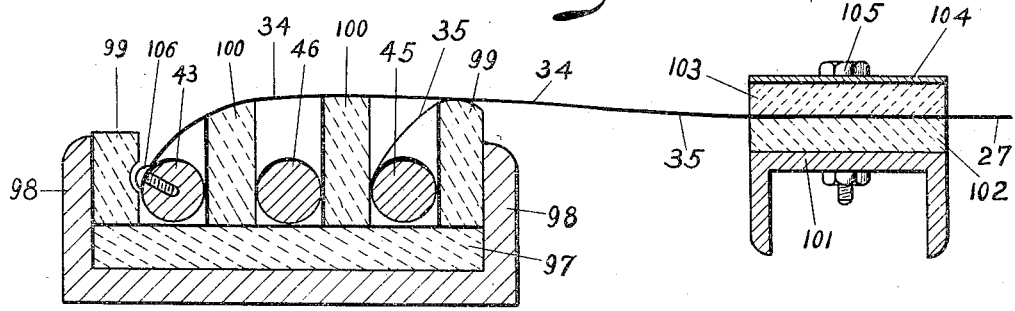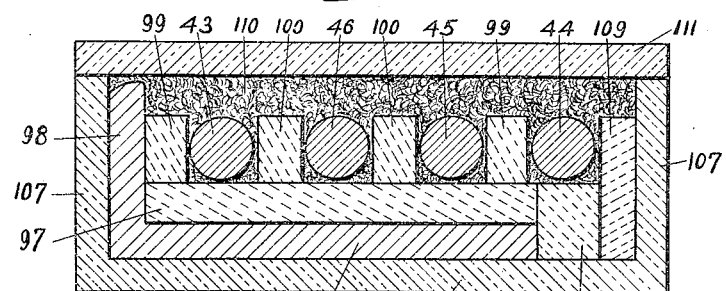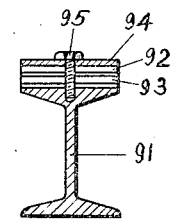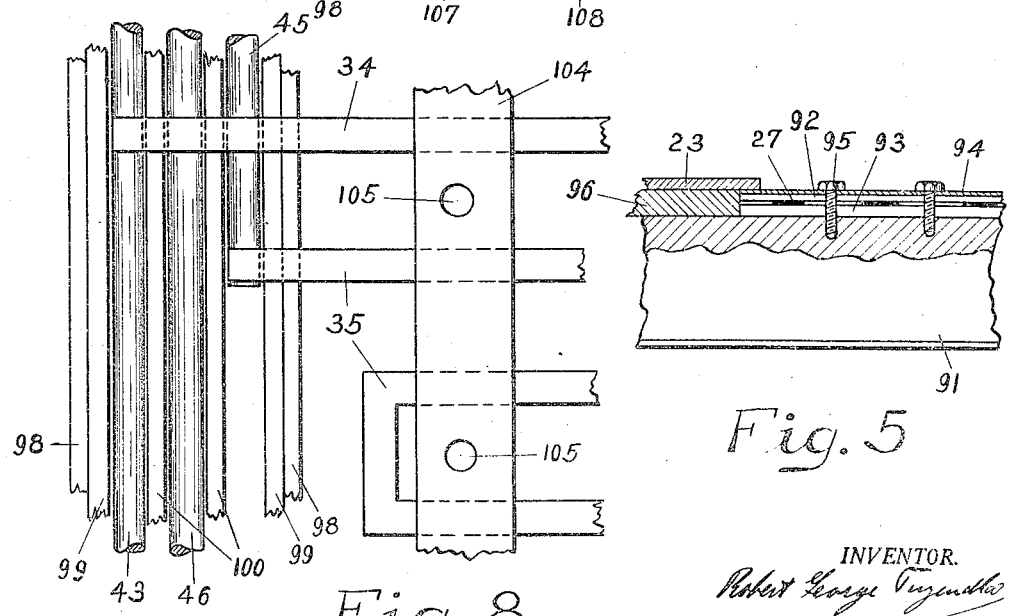

Patented Apr. 21, 1925.

1,534,042

UNITED STATES PATENT OFFICE.

ROBERT GEORGE TUGENDHAT, OF SAGINAW, MICHIGAN, ASSIGNOR TO BAKER-PERKINS COMPANY, INCORPORATED, OF WHITE PLAINS, NEW YORK.

ELECTRICALLY-HEATED TRAVELING OVENS.

Application filed August 1, 1924. Serial No. 729,535.

*To all whom it may concern:*

Be it known that I, ROBERT GEORGE TUGENDHAT, a citizen of the Republic of Czechoslovakia, residing at Saginaw, in the county of Saginaw and State of Michigan, have invented new and useful Improvements in Electrically Heated Traveling Ovens, of which the following is a specification.

This invention relates to the heating installation for traveling ovens, in which the articles to be heated, dried or baked, are carried through the baking chamber on platforms or trays moving lengthwise through the same, and has for its object to perform this operation in the most efficient and accurate manner, to simplify the supervision and reduce it, where required, to a minimum, and to render the construction to the highest degree simple, durable and inexpensive.

To this end, I heat the oven by means of electric heaters of any suitable kind, placed within the baking chamber longitudinally to the same and preferably in two sets, one placed above the moving platform and the articles to be treated, and the other one beneath the platform in close proximity to its under surface. In order to be able to regulate the heat, which in ovens of this type—in consequence of their great length—is always difficult, I arrange the heaters in regular sections lengthwise and each section in subsections crosswise to the baking chamber, each section and subsection being separately controllable. Usually three longitudinal sections, each consisting of a row of three heaters, is the most favorable construction. I preferably employ as heaters ribbons of suitable metal arranged in zigzag fashion and connected with its ends to rod conductors connected to the mains leading electricity to the heaters.

The following description of a traveling oven for baking bread, which is also represented in the accompanying drawings, will serve more minutely to explain the details of my invention forming the subject of this application.

Figs. 1ª and 1ᵇ show in elevation the arrangement of the heaters in the oven.

Fig. 2 is a cross section of the oven on line 2—2 of Fig. 1.

Figs. 3ª and 3ᵇ are combined a plan of the upper heater, and Fig. 4 is the wiring diagram of the latter.

Figs. 5, 6, 7, 8 and 9 represent structural details of the supports of the heaters and their accessories.

Like numerals refer to like or similar parts in the figures.

The numeral 9 indicates the oven, 10 its top, 11 its bottom, 12 and 13 its side walls, 14 the baking chamber which it encloses, 15 its entrance and 16 its exit. The ceiling 17 carrying the top 10 is supported by the girders 18. The loaves 19 to be be baked are placed on the wheeled platforms 20 in the usual way revolubly attached to and moved through the baking chamber 14 by means of the conveyer chains 21 driven by the sprocket wheels 22. The wheels of the upper flight of the platforms which carry the loaves 19, run on the tracks 23, and those of the lower flight, in which the platforms point downwards, on the tracks 24.

The baking chamber 14 is heated by two sets of electric heaters, 25 arranged above the loaves 19 carried by the upper flight of the platforms 20, and 26 below the latter in as close proximity to their bottom surface as the circumstances allow. The resistance elements of the heaters shown consist of suitable metal ribbons 27, preferably composed of an iron alloy as nichrome, and arranged in zigzag fashion. As shown in Figs. 1ª and 1ᵇ, the heaters extend throughout the whole length of the baking chamber 14 and form three distinct sections of about equal length, the upper heater 25 being composed of the section 28, 29 and 30, and the lower heater 26 of the sections 31, 32 and 33. The long stretches of the ribbons 27 are usually arranged parallel to the inner surface of the side walls of the baking chamber 14. Each individual section of the heaters is composed of subsections, that is a row of heater units arranged side by side across the baking chamber, as is shown in Figs. 3ª and 3ᵇ for the upper heater 25, each section of which has three subsections of about equal size and each consisting of a single heating unit. Section 28 thus contains the heater units 34, 35 and 36, section 29, the units 37, 38 and 39, and section 30, the units 40, 41 and 42. I usually and preferably divide both—the top as well as the bottom—heaters into the various sections described, but under certain circumstances it may be possible and of advantage to construct only one of the heaters in this manner.

The ends of the ribbons of each heater unit are suitably connected—riveted, soldered, welded or bolted—to steel rods extending sidewise into the baking chamber 14. Thus, in section 28, one end of the ribbons forming the units 34, 35 and 36 are joined to the rod 43, while their opposite ends are connected to separate rods, the end of 34 to rod 44, the end of 35 to rod 45, and the end of 36 to 46. In the same way, the heater units 37, 38 and 39 of the section 29 are connected at one end to the rod 47, and at their opposite ends to the rods 48, 49 and 51 respectively, and the heater units 40, 41 and 42 of the section 30 at one end to the rod 51, and at their opposite ends to the rods 52, 53 and 54 respectively.

The arrangement for leading electricity from its source to the conductor rods and thus to the single units is such that each section can be controlled as a whole, and each single unit of each section separately and independently. I represent in the wiring diagram, Fig. 4, the arrangement I prefer, and it will be understood that any other special construction of the single heaters, any other number of conductor rods or similar connectors and any other wiring system may be used under this invention, as long as by their means their purpose as stated above is attained.

In Fig. 4 the conductor rods 43, 47 and 51 to which the units of the sections 28, 29 and 30 are respectively connected at one end, are joined by the line wires 55, 56 and 57 respectively to the main wire 58. The rods 44, 45 and 46, to which the opposite ends of the units 34, 35 and 36 are respectively fixed, are connected by the line wires 59, 60 and 61 respectively to the main wire 62. The corresponding rods 48, 49 and 50 of the units forming section 29 are joined by the line wires 63, 64 and 65 respectively to the main wire 66, and the rods 52, 53, 54 of the units forming the section 30, by the line wires 67, 68 and 69 respectively to the main wire 70. Each of these nine line wires is provided with a switch; switch 71 is arranged in line 59 controlling the unit 34, switch 72 in line 60 controlling the unit 35, switch 73 in line 61 controlling the unit 36, switch 74 in line 63 controlling the unit 37, switch 75 in line 64 controlling the unit 38, switch 76 in line 65 controlling the unit 39, switch 77 in line 67 controlling unit 40, switch 78 in line 68 controlling the unit 41, and switch 79 in line 69 controlling the unit 42.

Electricity is led to the main wires 58, 62, 66 and 70 by the feed wires 81, 82, 83 and 84 respectively. Switches are arranged in the latter three wires to control the electricity flowing therethrough, namely switch 85 in feed wire 82, switch 86 in wire 83 and switch 87 in wire 84. By these three switches each section of the heater is controlled as a whole, switch 85 controlling section 28, switch 86 controlling section 29, and switch 87 controlling section 30.

In order to attain for the electric current the voltage best suitable for the heaters, and for their work, transformers are provided preferably in the feed wires; thus the wire 82 is connected to the transformer 88, the wire 83 to the transformer 89, and the wire 84 to the transformer 90.

Fuses, automatic switches, voltmeters, thermo-indicators and regulators and similar appliances necessary or useful in installations of this kind are provided, in order to make the baking operation as automatic and safe as possible.

The ribbons forming the heaters and the rod connectors leading the current thereto are carried by insulators which may be arranged at the ceiling and walls of the baking chamber and at the girders carrying the top of the oven and those carrying the upper tracks. I preferably construct these supports in the manner shown in Figs. 5—9.

Fig. 5 represents in part a longitudinal vertical section of a girder 91 placed across the baking chamber to carry the tracks 23 and supporting on its top the insulated ribbon 27. The latter are enclosed between two strips, 92 and 93, of insulating board about as broad as the flange of the girder 91 and extending somewhat underneath the end part of the horizontal part of the track 23. A thin metal plate 94 of similar width covers the top board 92, and the set screws 95, passing in the midst between two ribbons 27 through aligned openings in the plate 94 and the boards 92 and 93 into the solid top part of the girder 91, hold these parts rigidly together and thus fix the insulated ribbons 27 in their proper position. In Fig. 6 the same girder 91, the insulating device and a set screw 95 are shown in cross section. As for the sake of greater firmness the insulating boards 92 and 93 and the plate 94 extend underneath the bottom of the track 23, it is necessary to interpose between the latter and the top of the girder 91 the small metal block 96. In the same manner the ribbons 27 of the upper heater 25 are carried by the girders 18 supporting the ceiling 17; only the insulating boards 92 and 93 with the ribbons between are then screwed onto the bottom flange of these girders.

In places, where no girders for the support of the ribbons are available as is often the case near their bent ends, I employ inverted channel irons for attaching thereto the insulating boards, between which the ribbons 27 are arranged. Inside the baking chamber 14 the connector rods are carried in channel irons, insulating material being placed between its walls and the rods, as well as between the latter. These arrangements are shown in cross section in Fig. 7 and in plan in Fig. 8 for the rods 43, 45 and 46 and the heater units 34 and 35. The rods are placed parallel to each other on a suitable insulating board 97 laid on the bottom of the channel iron 98 extending across the baking chamber 14 and are separated from the walls of the channel by thick insulating strips 99 and from each other by similar strips 100. At a suitable distance from the channel iron 98 I arrange parallel to the latter a second channel iron 101, which may be considerably smaller, as it has less to carry, place on its flat surface pointing upwards a strip 102 of insulating material, on top of the same the ribbons 27, on top of the latter another similar insulating strip 103 and on top of the latter a thin metal plate 104 and bolt all these parts rigidly together by means of a screw bolt 105 passing between two adjacent ribbons 27 through aligned openings in the plate 104, the strips 102 and 103, and the bottom part of the channel iron 101. The heater 34 is shown as rigidly fixed with one end to the rod 43 by means of the set screw 106, while the adjacent end of the heater 35 is connected to the rod 45 as indicated in dotted lines.

While one end of the girder 98, carrying the conductor rods, is fixed in the side wall 13 of the oven, its opposite end rests on the bottom of box 107 made of suitable refractory material and enclosed in the side wall 12. Fig. 9 shows a vertical cross section of this arrangement. The box 107 is somewhat wider than the channel iron 98, and the side wall of the latter has been cut away so as to allow to insert in its place the rod 44, which is connected to the end of the heater 34 nearest to the side wall 12. The insulating board 97 and strips 99 and 100 retain the same position; between the rod 44 and the bottom and side wall of the box 107 suitable strips 108 and 109 of insulating material are inserted. The upper empty part of the box 107 and the interstices between the rods and the insulating strips are filled with a flaky or powdery insulating material 110, and the box is then closed by the lid 111.

I claim:

1. In a traveling oven, the combination with a baking chamber provided with corresponding openings at both ends, of moving platforms carrying the articles to be baked therethrough, and of two sets of electric heaters, one placed above the said platforms, and the other one beneath the same, one of the said sets consisting of a suitable number of sections arranged lengthwise in the said chamber, each section thereof being separately controllable, and the other set being controlled as a whole.

2. In a traveling oven the combination with a baking chamber provided with corresponding openings at both ends, of moving platforms carrying the articles to be baked therethrough, and of two sets of electric heaters, one placed above the said platforms, and the other one beneath the same, each of the said sets consisting of three sections arranged lengthwise in the said chamber, and each section thereof being separately controllable.

3. In a traveling oven, the combination with a baking chamber provided with corresponding openings at both ends, of moving platforms carrying the articles to be baked therethrough, and of electric heaters arranged lengthwise in the said baking chamber to form a suitable number of sections, each section being divided across the said baking chamber into a suitable number of subsections, and each of the said sections as a whole, and each subsection being separately controllable.

4. In a traveling oven, the combination with a baking chamber provided with corresponding openings at both ends, of moving platforms carrying the articles to be baked therethrough, and of electric heaters arranged lengthwise in the said baking chamber and forming three sections, each section being divided across the said baking chamber into three heater units, each of the said sections as a whole, and each heater unit being separately controllable.

5. In a traveling oven, the combination with a baking chamber provided with corresponding openings at both ends, of moving platforms carrying the articles to be baked therethrough, of electric heaters of the ribbon type arranged lengthwise in the said baking chamber and forming a suitable number of sections, each section being divided into a suitable number of subsections, and of connector rods, to which the ribbon ends of each subsection are affixed, the connections of the ribbon ends and the connectors being so arranged that each section as a whole, and each single subsection become separately controllable.

6. In a traveling oven, the combination with a baking chamber provided with corresponding openings at both ends, of moving platforms carrying the articles to be baked therethrough, of electric heaters of the ribbon type arranged lengthwise in the said baking chamber and forming a suitable number of sections, each section being divided across the said baking chamber into a suitable number of subsections, of connector rods to which the ribbon ends of each subsection are attached, of main wires, of line wires connecting the said rods with the said main wires, of feed wires leading electricity to the latter, and of two sets of switches, one for the line wires and the other one for the feed wires, the connections of the said subsections to the said rods, the arrangement of the various wires named, and the location therein of the said switches being such, that each of the said sections as a whole, and each of the said subsections are separately controllable.

7. In an electric installation for heating traveling ovens, a main heater longitudinally arranged in the baking chamber of the oven and composed of a number of sections, each section consisting of a number of heating units arranged crosswise in the baking chamber, a series of connector rods, one for each section, each unit of which is connected with one end thereto, a single main wire to which the said series of connector rods is joined by line wires, a second series of connector rods, one for each unit, which is connected thereto with its other end, a series of main wires equal in number to that of the said sections, a series of line wires equal in number to that of the said units, each connecting one of the said second series of connector rods to one of the said series of main wires, and those belonging to the units forming the same section being connected to one and the same of the said series of main wires, a set of switches, one provided in each of the line wires forming said series, whereby each unit is separately controlled, feed wires, one for each main wire, and a second set of switches, one for each of those feed wires connected to the said series of main wires, whereby each section is controlled as a whole.

8. In a traveling oven, in combination a baking chamber provided with corresponding openings at both ends, a set of girders supporting the ceiling of the said baking chamber, moving platforms carrying the articles to be baked through the latter, tracks, on which the said platforms run, a second set of girders supporting these tracks, two sets of electric heaters of the ribbon type, the long stretches of the ribbons of one set being placed between boards of insulating material affixed to the bottom flanges of the first set of girders, and those of the other set between boards of insulating material affixed to the top flanges of the second set of girders, inverted channel irons carrying affixed to their flat top surfaces insulating boards, between which the ribbons near their ends and bends are enclosed, connector rods to which the ends of the ribbons of the heaters are fixed, channel irons for keeping the said rods in their channels, insulating material interposed between the said rods and between the latter and the walls and bottom of the last named channel irons, and wires leading electricity to the said rods.

ROBERT GEORGE TUGENDHAT.